July 21, 1959 H. R. HABIG 2,895,392
IMAGE MOTION COMPENSATING FILM CONTROL APPARATUS
Filed May 26, 1954
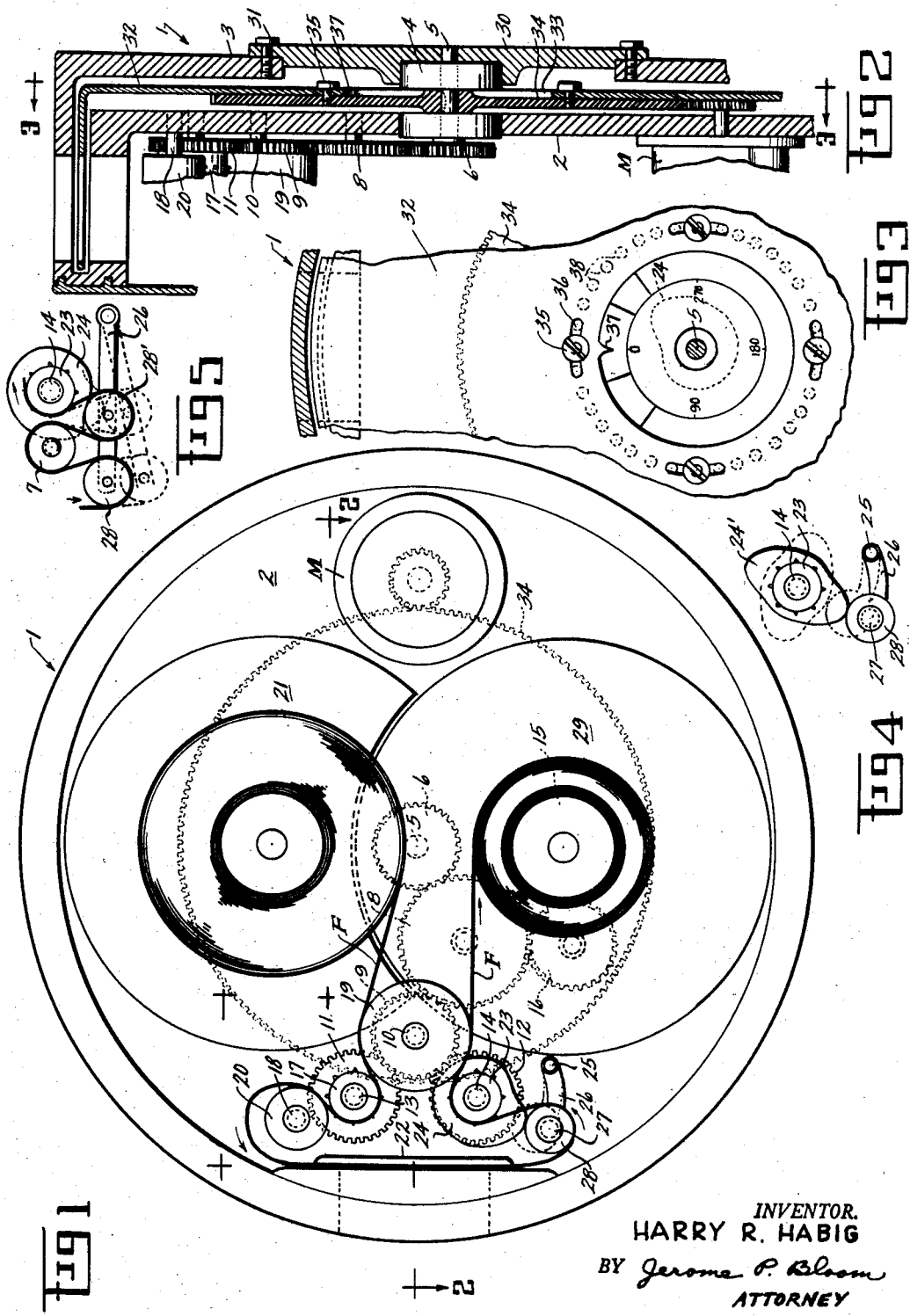
INVENTOR.
HARRY R. HABIG
BY Jerome P. Bloom
ATTORNEY United States Patent Office 2,895,392
Patented July 21, 1959

2,895,392

IMAGE MOTION COMPENSATING FILM CONTROL APPARATUS

Harry R. Habig, Dayton, Ohio

Application May 26, 1954, Serial No. 432,347

9 Claims. (Cl. 95—12.5)

This invention relates to a novel method and apparatus for film transport in cameras which is of a highly simplified and efficient nature. The subject invention moreover is directed to apparatus which effects a complete range of control of film speed through the film gate of a camera for acceleration or deceleration thereof through the film gate only and according to the predetermined requirements of the application of the camera within which it is incorporated to effect image motion compensation in such camera with a high degree of accuracy of film registration and to an extent not within the contemplation or scope of the prior art.

Image motion compensation and good film registration in conjunction therewith in high speed cameras has become a serious problem, especially where the camera is used for aerial surveying or reconnaissance, due to the high speeds of present and future anticipated aircraft relative to the target when taking pictures. The cameras employed for such purposes must have a wide range capacity to meet the anticipated and predetermined conditions of altitude and speed of the aircraft when making exposures as well as compensate for the focal length of the lens employed in the camera.

With respect to prior type film transport mechanism the invention results in a reduction of cost of production of a camera while providing it with a wide range capacity of application and a more positive control of film speed throughout its cyclic operation. Its novel structural arrangement not only reduces friction on film during its operation, resulting both in minimum of wear on the film and a substantial reduction of gate scuffing but also the invention apparatus induces harmonic motion in the film as it travels through the film gate to enable superior film registration, even at high speeds.

Moreover, the novel highly simplified film transport mechanism employed, by a simplified interrelation with an improved shutter control which is adjustable relative thereto, enables the film at the time of exposure to be in any condition from dwell to more than twice the film surface speed over the film feed sprocket. Thus the speed of the film at time of exposure can be positively predetermined according to the intended application of the camera and pre-set in the camera modified in accordance with this invention. In this manner the camera can accurately be adapted to meet the conditions of use thereof to give superior results and when the same camera is desired to be employed under different conditions, by a mere adjustment in a simple fashion of the shutter relative to the novel transport mechanism the same accuracy in use of the camera may obtain.

Further, the invention contemplates an improved arrangement of the film drive sprockets in association with bearing rollers in a camera so that the film is traveling at an 180 degree angle at most times, particularly when moving through the film gate in relation to the towing sprocket so as to reduce damage and scuffing of the film to a minimum.

One important feature of novelty of the invention is provided by the integral mounting of a cam on the take-up sprocket which acts through a roller on a free swinging arm to directly affect the film and positively control the speed of the film through the film gate, only, during any portion of a cycle while maintaining a constant predetermined speed of the film over the feed sprocket and the take-up sprocket. Another most important feature of novelty is a predetermined connected and adjustable relationship of the shutter in the camera relative to the cam which is integrally mounted on the take-up sprocket so that image motion compensation may be accurately and inherently provided by the novel invention structure while providing superior film registration over a wide range, and a varying range of conditions of use of the camera.

An object of this invention is to provide an improved film transport mechanism for cameras whereby highly accurate image motion compensation may be provided with a maintenance of superior film registration quality.

Another object of this invention is to provide a highly simplified film transport control mechanism which produces harmonic motion in the film as it travels through the film gate, causing a substantial reduction of gate scuffing of the film and damage thereto.

A further object of the invention is to provide a novel film transport mechanism which substantially reduces friction on film during its operation with an accordingly substantial reduction in the power necessary to drive the film transport mechanism.

An additional object of this invention is to provide a novel adjustable association of the film transport control mechanism and the shutter in a camera whereby highly accurate image motion compensation as well as superior film registration may be assured throughout a wide range of application of the camera.

Another object of the invention is to provide an improved film transport control mechanism whereby a positive action through the film take-up sprocket, having a control cam integrally connected thereto, can effect acceleration and deceleration of the film through the film gate, only, at predetermined speeds in a positive and accurate fashion in an identical frequency throughout continued cyclic operation of the camera.

Other objects and advantages of the invention will become readily apparent to those versed in the art from the following description taken in conjunction with the accompanying drawings wherein:

Fig. 1 of the drawings presents the novel structural arrangement of the improved film transport control mechanism provided by the invention apparatus.

Figure 2 is a sectional view taken on line 2—2 of Figure 1 showing the novel association of the shutter control relative to the film transport control mechanism.

Figure 3 is a view of the novel shutter relationship to the improved film transport mechanism as taken on line 3—3 of Figure 2.

Figure 4 shows a modification of the novel apparatus as shown in Figure 1 of the drawing.

Figure 5 shows an additional type of modification contemplated with respect to the novel apparatus shown in Figure 1.

The novelty of the invention and its advance in the art of image motion compensation provision in a camera can best be seen in reference to the drawing wherein as seen in Fig. 1 a camera housing 1 is shown wherein spaced inner and outer walls 2 and 3 are respectively provided. Mounted in bearings 4 in the spaced walls 2 and 3 is a main drive shaft 5. Mounted on the inner end of the main drive shaft 5 is a pinion 6 in driven relationship through gear 34 to a motor M. Connected in driven relationship through gear 34 and pinion 6 is an idler gear 8 which drives through an idler 9 mounted on fixed shaft 10 and geared to gears 11 and 12 to produce a simultaneous driving of the gears 11 and 12 which are respectively integrally connected to the feed sprocket 17 and the take-up sprocket 23. The idler 8 drives the take-up spool gear 15 simultaneously through an idler 16. The feed sprocket 17 is rotatively mounted on feed shaft 13. In opposition to the shaft 10 is disposed a shaft 18. The shafts 10, 13, and 18 are all fixedly mounted in the inner wall 2 of the camera housing. Roller bearings 19 and 20 are respectively and rotatively mounted on the shafts 10 and 18 to provide film bearing surface to either side of the film feed sprocket 17 and to maintain the film in engaging relation to the feed sprocket 17 as it is driven thereby. Thus the film F passes from a feed spool 21 over roller bearing 19 adjacent the film speed sprocket, around the feed sprocket and over adjacent roller bearing 18 and down through the film gate 22 to form the upper film loop thereby.

Mounted for rotation on the film take-up sprocket shaft 14, which is fixed to the wall 2, is the film take-up sprocket 23 which has a cam 24 integrally connected in any suitable manner adjacent the inner end thereof and spaced inwardly therefrom. The cam 24 in the example as shown is a volute type cam for illustrative purposes. Integrally connected at the inner end of the sprocket 23 is film sprocket drive gear 12 which is driven from the main drive pinion 6 simultaneously as the feed sprocket and the film take-up spool are driven. Fixedly mounted in the inner wall 2 of the housing is a pivot pin 25 having an arm 26 pivotally mounted thereon for free-swinging movement relative thereto. A pin 27 is fixed to the outer end of the arm 26 in alignment with the pin 25 and has a film spacing roller 28 rotatively mounted thereon. The film F travels through the film gate under and around the film spacing roller 28 and over the film-take-up sprocket 23 being retained in engagement therewith by roller bearing 19 adjacent thereto as it moves to the film take-up spool 29. This accordingly forms the lower film loop.

The outer wall 3 of the camera housing has an opening therein which is closed by a removable cover plate 30 by engaging bolts 31. Mounted for rotation between the spaced housing walls 2 and 3 in a drum type shutter 32 having an opening 33 in alignment with the opening in the wall 3 and arranged cocentrically with the main drive shaft 5. Fixed to the main drive shaft 5 between the bearings 4 is the drive gear 34 which is also a reference disc. The shutter 32 is bolted to the disc 34 about the opening 33 therein by bolts 35 which pass through slots 36 in the shutter plate for adjustment relative thereto. The shutter 32 has a reference pointer 37 integral therewith in fixed relation to the shutter aperture. The indicia or reference plate 34 which is keyed to the shaft 5 has an outline or graph of the particular shape of the cam 24 employed superimposed thereon and a scale suitably indicated in degrees thereon in circular fashion relative to this take-up sprocket cam. The shutter reference pointer is cooperatively associated with this scale so that by loosening the bolt members 35 and adjusting the pointer which defines the shutter aperture relative to the indicia plate, which is fixed on the shaft 5, the shutter aperture will make an exposure in accordance with a predetermined film acceleration or deceleration through the film gate, only, as indicated by the reference pointer 37 on the indicia plate 34 by the predetermined relative setting. As can be seen, the indicia plate 34 has threaded openings 38 spaced thereabout so that an adjustment of the shutter aperture setting relative to any particular point on the cam may be made through a full 360 degrees. The particular shape of the cam 24 at any particular point defined by the reference pointer setting will indicate a predetermined acceleration or deceleration of the film through the film gate at the time of exposure.

In accordance with the novel invention, the shape of the cam 24 integral with the take-up sprocket 23 is so designed as to cause by its bearing on the film spacing roller 28 on the free swinging arm 26 and the resulting bearing of the roller 28 on the film a harmonic motion of the film, through the film gate only, throughout a cycle. Employing the volute cam shown to vary the tension on the film as it is taken up by the sprocket 23 enables a speed variation of the film, through the film gate only, from a complete film dwell or stoppage to twice the film surface speed over the sprocket 23 by which it is towed. By the contour of the cam 24 and its integral relation to the take-up sprocket the path and arc of the film spacing roller 28 during the film transport cycle is positively and directly controlled and accordingly an appropriate desired deceleration or acceleration of the film, through the film gate only, may be varied through a wide range in accordance with the particular cam contour employed. The volute cam shown is merely illustrative and a number of cam contours may be employed as long as they are of the family that will produce the desired harmonic motion of the film through the film gate only.

In the practical embodiment of the invention shown the cycle of operation of the camera proceeds as follows. In accordance with the image motion compensation required for the situation of intended use of the camera, the bolts 35 are loosened and the setting of the shutter aperture as represented by the pointer 37 is adjusted relative to the fixed reference plate 34 which constitutes the main drive gear so that the pointer indicates the point on the cam 24 which defines the desired speed of the film, through the film gate only, at the time of exposure. The bolts 35 are then fastened through the appropriate slots and openings 38 and the slots provide a vernier adjustment for detailed accuracy. The remarkable accuracy of this predetermined setting is effective only because of the integral connection of the cam 24 to the take-up sprocket 23 as well as the integral connection of the take-up sprocket drive gear 12 thereto which gear 12 is directly driven by main drive gear and shutter reference plate 34.

Then upon the energization of the motor M, the gear reference plate 34 is driven to drive pinion 6 which drives through idlers 8 and 9 to simultaneously drive the feed sprocket gear 11, the take-up sprocket gear 12 and, through take-up gear 16, the take-up spool gear 15 at a predetermined speed.

The gear 11 being integral with the feed sprocket 17, the film is accordingly drawn off the feed supply spool, the opposed roller bearings 19 and 20 inducing a substantially 180 degree entrance and exit from the sprocket 17 and retaining the film positively and effectively in engagement with the sprocket 17. The film is led over the roller 20 to the film gate with a predetermined upper loop as shown. The film passes through the film gate 22 maintaining a substantially 180 degree angle as it engages under roller 28 and is lead around the roller over take-up sprocket 23 with roller bearing 19 biasing and insuring continuous engagement of the film with the take-up sprocket as it passes on its way to and around the take-up spool.

As shown, when the high point on cam 24 is bearing on the film spacing roller 28, the film passing through the film gate as well as all other portions of the film between the supply and take-up spools is traveling at the predetermined driving speed, or film surface speed over the sprockets, and the lower film loop is under a predetermined tension as it retains the roller 28 against the high point on the cam 24. The contour of the cam is such then to have a marked smooth reduction in radius and as can be seen the tension caused by the roller 28 is suddenly completely relaxed. The sprockets 17 and 23 continue to drive at the same speed. Due to the relaxing of the roller 28, the sprocket 23 has to take up film, during which period there is a complete stoppage of a frame of the film in the film gate only. The length of stoppage or dwell depending on the contour of the cam or length of continued sharp decline in the contour will be governed by the picture desired if, for example, exposure is to be made when the film is in a condition of dwell. The relaxation of the roller 28 on the film, of course, causes a slack in the lower film loop which guarantees a positive dwell of the film, in the film gate only, at the moment; this being so even though the rest of the film continues to travel at the set speed. This smooth and sure action as controlled by cam 24 enables excellent film registration as well as avoids sudden high velocity increases or decreases in the film speed as are prevalent in the use of the complex film control mechanisms of the prior art. The cam contour is then designed to rise to swing the arm 26 and the film spacing roller 28 back to the film with a resulting tension that constantly accelerates the film, through the film gate only, taking up the build up that occurred in the upper film loop during the dwell period to provide an acceleration of the film through the film gate that is up to twice the film surface speed over the sprockets in the example shown. As is obvious the shape of the cam 24 can be varied to provide any variation of speed of the film through the film gate desired during the cycle of operation. This control of acceleration of film, through the film gate only, is particularly important in aerial cameras where image motion compensation is necessary due to the speed of aircraft relative to the target when exposure is made. There need be no dwell period occasioned by the cam 24 if it is desired so, under which circumstances there would not be sufficient sharp decline in the cam contour to cause a dwell. But a dwell is possible with this novel invention as shown by the illustrated embodiment of the invention which feature clearly indicates the remarkable versatility occasioned in a camera by the incorporation of the invention apparatus therein.

As can be readily seen, by the proper setting of the shutter aperture relative to the cam 24 in the simple novel manner described and shown, the exposure can be positively and accurately made in cyclic fashion with identical sequence activity when a particular desired set acceleration of the film in the film gate is occurring. It is emphasized that the construction of the cam 24 integral with the film take-up sprocket and the shaping of the contour of such cam so as to produce harmonic motion of the film in the film gate only enables the remarkable wide range image motion compensation capabilities produced in a camera by the novel invention. Moreover, correspondingly excellent film registration characteristics result therefrom with identical sequence activity to effect a superior camera.

Of course when the cam rises to another high point, then the cycle starts all over for the taking of another exposure.

Depending on the amount of film motion needed for image motion compensation the swinging arm 26 may necessarily have an additional roller mounted thereon closer to or further from the arm hinge point to directly contact the cam 24 while the roller 28 is spaced on the arm from the extra roller and contacts the film. This can change the leverage on the arm and the travel thereof.

It is noted that in no instance does the gearing have any effect on the accuracy of film registration on exposure. By this invention the accuracy of film registration as shown is positively controlled by the shape of the control cam 24 in conjunction with the free swinging film spacing roller 28. As long as the film sprocket pitch and film perforation pitch are accurate, there will be positive cyclic control with identical continuity.

A novel feature of this invention is that with the induced harmonic motion of the film, through the film gate only, caused by the cam acting through the roller 28 on the film as it passes through the film gate during the pull down portion of a cycle, there is caused a relieving and reducing of friction on the film in the film gate, reducing to a minimum film damage and gate scuffing. In fact, by the elimination of the prior art claw type registration control devices by the novel arrangement of the cam and the film spacing roller in the invention apparatus, friction is reduced throughout the system and vibration is also eliminated, both to such an extent that the actual power or motor torque needed to drive the film transport mechanism is reduced to a minimum providing a substantial saving of supply energy thereby.

Moreover, the substantially 180 degree turns induced in the film by the arrangement shown and the positioning of the sprockets and bearing elements relative to the film gate causes the film to assume a natural flow contour and further enables full positive pressure plate pressure when the film is stationary in the film gate.

Noting the modification of Fig. 5 of the drawings, the degree of acceleration of the film through the film gate may be increased during the pull down portion of the cycle by increasing the number of rollers 28 on the swinging arm 26 about which the film is to pass to provide tension thereon. Of course, for each additional roller there will have to be an idler roller 7 provided mounted on a fixed shaft on the camera housing wall. For example, by the use of two rollers 28 and 28', as shown, a mechanical advantage is obtained that will double the range of acceleration of the film during its travel through the film gate during the pull down portion of the cycle relative to an arrangement employing a single roller 28.

Fig. 4 of the drawings shows a modification of the cam 24, in the form of a single frame cam 24', which may be employed integral with the take-up sprocket where a single frame picture is desired rather than the double frame picture obtained with the volute cam 24.

As can be readily seen, the novel improved apparatus of the invention enables a camera providing wide versatility of application and use, particularly providing a significant development in the image motion compensation art to provide a positive predeterminable accuracy of control of film speed in the film gate, throughout an extremely wide range, at time of exposure with an induced harmonic motion of the film, through the film gate only, obtaining superior film registration at any speed or even at dwell.

While a specific practical embodiment and application of the invention has been shown and described herein, many other applications and modifications thereof will become readily apparent to those versed in the art therefrom, and such is considered to lie within the scope of the invention.

I claim:

1. Film transport control apparatus for a camera including a film feed sprocket, a film take-up sprocket and a film gate interposed therebetween comprising, a smooth contoured cam means integrally connected to the take-up sprocket coaxially therewith, a free swinging arm pivoted adjacent the take-up sprocket, a film spacing roller rotatively mounted on the free swinging arm engaging the film intermediate the film gate and the take-up sprocket as it flows therebetween, means for driving said sprockets at a continuously uniform speed, the film freely biasing said film spacing roller against said cam as the take up sprocket rotates to be tensioned by said cam in varying degrees during cyclic operation of the take-up sprocket to induce a wide range of acceleration and deceleration of the film through the film gate only, the conformation of said cam being such as to induce harmonic motion of the film, through the film gate only, and a shutter operatively connected to said cam means for synchronous rotation therewith, said shutter having means defining an exposure aperture, said shutter and said cam means being relatively adjustable in a rotative sense to shift the cyclic position of said exposure aperture relative said cam means, thus providing image motion compensation to a variable degree along with precise registration within a single camera unit.

2. Film transport control apparatus for a camera including a film feed sprocket, a film take-up sprocket and a film gate interposed therebetween comprising, a smooth contoured assymetrical cam means integrally and coaxially mounted on the take-up sprocket, a free swinging arm mounted on a pivot arranged adjacent said take-up sprocket, a cylindrical film spacing element mounted on the free swinging arm engaging the film intermediate the film gate and the take-up sprocket as it flows therebetween, the film freely biasing the film spacing element against the cam as the take-up sprocket rotates to be tensioned by said cam in varying degrees during cyclic operation of the take-up sprocket inducing a wide range of acceleration and deceleration of the film in the film gate, the conformation of the cam being such to induce harmonic motion of the film, through the film gate only, a shutter operatively connected with said cam means and driven at the same predetermined speed and adjustable relative said cam means in rotative sense through a range of 360 degrees to shift the cyclic position of the exposure interval of said shutter whereby exposures may be made at any predetermined desired speed of the film in the film gate.

3. Image motion compensation film transport control apparatus for a camera having a film feed sprocket, a film take-up sprocket and a film gate interposed therebetween comprising, a film tensioning means integrally and coaxially connected to the film take-up sprocket and operatively engaging the film intermediate the film gate and the take up sprocket inducing harmonic motion of the film, through the film gate only, a shutter, a main drive gear, means adjustably connecting said shutter on said main drive gear to provide relative adjustment therebetween in a rotative sense, said main drive gear being geared to the take-up sprocket and its integrally connected film tensioning means whereby on adjustment of said shutter on and relative to said main drive gear, the exposure interval of said shutter may be positively shifted to any predetermined portion of the cyclic rotation of the take-up sprocket to provide a positive predetermined image motion compensation at the time of exposure with superior film registration.

4. Film control apparatus for a camera effective to apply image motion compensation to the film therein comprising, a main drive shaft, a film feed sprocket, a film take-up sprocket, drive means fixedly secured to the main drive shaft, means interconnecting said drive means with said sprockets for synchronous rotation thereof, a film gate intermediate said sprockets, a fixed loop forming roller means preceding the film gate, the film being directed over the feed sprocket and roller means through the film gate and over the film take-up sprocket, an irregularly shaped smooth contoured disc integrally connected to the take-up sprocket for rotation therewith, a free swinging arm having roller means thereon pivoted adjacent said take-up sprocket, said roller means freely engaging said film applying tension thereto, the film freely biasing said roller means against said disc, said disc being so shaped as the take-up sprocket rotates to induce harmonic motion of the film through the film gate and vary the tension on the film to cyclically cause a varying degree acceleration or deceleration thereof, through the film gate only, continuously throughout each cycle and a shutter connected to said drive shaft and adjustable relative thereto in a rotative sense through a range of 360°, said shutter having means defining an exposure slit, the adjustment of said shutter shifting the cyclic position of said exposure slit relative said disc so that a completely variable range of image motion compensation is provided in a single camera unit.

5. Film control apparatus for a camera including a film feed sprocket, a film take-up sprocket, and a film gate interposed therebetween comprising, a film spacing cam integral with the take-up sprocket, drive gear means operatively connected with and simultaneously driving said sprockets at uniform speed, said cam cyclically applying a varying tension to the film intermediate the film gate and the take-up sprocket and being so shaped as to induce harmonic motion of the film, through the film gate only, and shutter means mounted on said drive gear means and drivingly connected with said cam and rotatively adjustable relative thereto to shift the position of the exposure interval of said shutter means whereby image motion compensation may be positively and accurately provided in the camera to conform to any intended application.

6. Film control apparatus for a camera effective to apply image motion compensation to the film therein comprising, a main drive shaft, a film feed sprocket, a film take-up sprocket, drive means fixedly secured to the main drive shaft, means interconnecting said drive means and said sprockets for synchronous rotation thereof, a film gate intermediate said sprockets, the film being directed over the film feed sprocket through the film gate and over the film take-up sprocket, a smooth contoured cam means integrally connected to the take-up sprocket for rotation therewith, a free swinging arm having spaced roller means thereon freely pivoted adjacent said take-up sprocket to a side away from said film gate, one of said roller means engaging the film intermediate the film gate and the take-up sprocket to apply tension thereto forming a film take-up loop, another of said rollers being biased against said cam by said film, said cam being so shaped as the take-up sprocket rotates to apply a varying tension to the film to cause harmonic motion of the film, through the film gate only, cyclically effecting a wide range of acceleration and deceleration thereof, in the film gate only, and shutter means connected to said drive means for synchronous rotation with said sprockets, said shutter and cam being relatively adjustable in a rotative sense to shift the position of the exposure interval of the shutter means in the cyclic operation of said cam whereby excellent film registration as well as image motion compensation may be provided.

7. An image motion compensating camera including a housing having an outer and an inner wall section, a feed sprocket and a take-up sprocket in said housing, means defining a film gate intermediate said sprockets, said housing having exposure apertures aligned with said film gate, a motor in said housing, a drive shaft bearing in said inner and outer wall sections having a drive gear fixed thereto to mount intermediate said spaced wall sections, said motor being geared through said drive gear to said sprockets for a simultaneous drive thereof at uniform speed, a drum shutter including exposure means fixed to the periphery of said drive gear for incremental rotative adjustment relative thereto and for movement therewith past the film gate and aligned housing apertures, and means operatively connected in engaging relation between said take-up sprocket and the film under the influence of the film intermediate the film gate means and the take-up sprocket for cyclically varying the rate of acceleration of the film and inducing harmonic motion of the film in the film gate while uniform film speed is maintained at said sprockets, said shutter having means defining an exposure opening shiftable in accordance with the incremental adjustment thereof to cyclically expose said film in the film gate at a precisely variable interval corresponding to a desired rate of travel of the film through the film gate.

8. An image motion compensating camera including a housing, a feed sprocket and a take-up sprocket in said housing, a film gate therebetween, a roller rotatably mounted in fixed position immediately preceding said film gate, said housing having means defining an exposure aperture in alignment with said film gate, a motor in said housing, a main drive shaft having a gear fixed thereto directly geared to said motor, said motor being geared to said sprockets through said shaft for simultaneous drive thereof at uniform speed, film being transmitted from said feed sprocket over said roller, through said film gate to form an upper loop, and up from the film gate over the take-up sprocket, a cam integral with said take-up sprocket, free floating means bearing on the film intermediate said gate and said take-up sprocket, biased to said cam by the film, said cam being formed to effect a graduated acceleration of the film through the film gate only through the medium of said free floating means, a shutter fixed to said gear on said drive shaft and having means defining an exposure slit connected integrally therewith interposed between said film gate and exposure aperture, and connecting means between said gear and said shutter for 360° adjustment of the shutter relative said gear whereby exposure may be made at any selected acceleration of the film through the film gate, said housing having means providing access to said connecting means to adapt the camera to provide the required image motion compensating characteristics.

9. An image motion compensating camera including a film feed sprocket, a film take-up sprocket, means defining a film gate therebetween, film control means connected to said take up sprocket for conjoint cyclic movement therewith, said film control means being operatively related to the film intermediate the film gate and the take up sprocket to cyclically vary the rate of speed of the film in the film gate and induce harmonic motion of the film through the film gate only and shutter means operatively related to said film control means to provide exposure of the film in the film gate at an interval related to the cyclic operation of said film control means and adjustable relative thereto to shift the exposure interval of said shutter means.

References Cited in the file of this patent

UNITED STATES PATENTS

| | | | |
|---|---|---|---|
| 943,253 | Meredith-Jones | Dec. 14, | 1909 |
| 995,061 | Duhem | June 13, | 1911 |
| 1,039,501 | Duhem | Sept. 24, | 1912 |
| 1,287,504 | Stechbart | Dec. 10, | 1918 |
| 1,750,401 | Goldberg et al. | Mar. 11, | 1930 |
| 1,932,691 | Cole | Oct. 31, | 1933 |
| 2,094,162 | Scott | Sept. 28, | 1937 |
| 2,144,088 | Scott | Jan. 17, | 1939 |
| 2,333,768 | Davies et al. | Nov. 9, | 1943 |
| 2,424,989 | Koepper | Aug. 5, | 1947 |
| 2,474,323 | Rattray | June 28, | 1949 |
| 2,713,814 | Sonne et al. | July 26, | 1955 |

FOREIGN PATENTS

| | | | |
|---|---|---|---|
| 228,785 | Switzerland | Sept. 15, | 1943 |
| 603,962 | Great Britain | June 25, | 1948 |
| 667,372 | Great Britain | Feb. 27, | 1952 |
| 1,011,705 | France | Apr. 9, | 1952 |
| 891,188 | Germany | Sept. 24, | 1953 |
| 1,060,123 | France | Nov. 18, | 1953 |
| 728,796 | Great Britain | Apr. 27, | 1955 |